Dec. 13, 1927.
O. W. THOMPSON
LAWN RAKE
Filed March 4, 1926
1,652,260
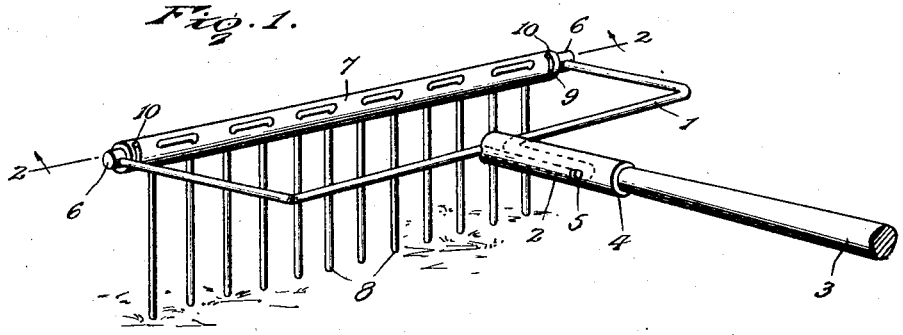
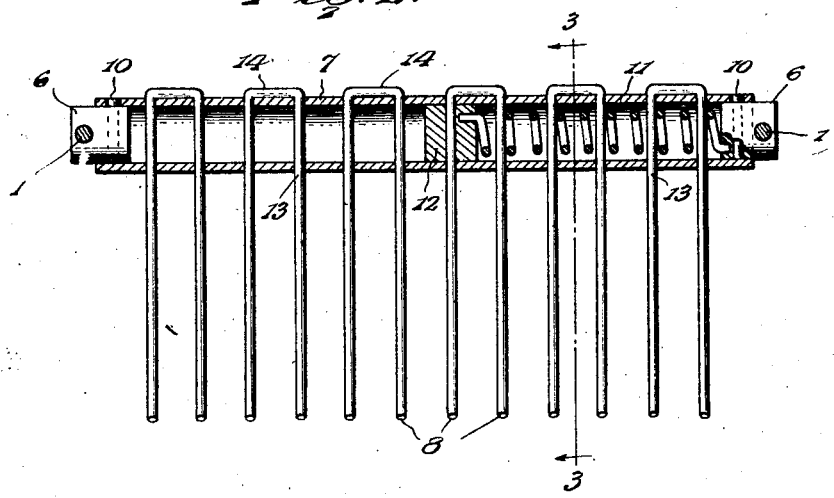
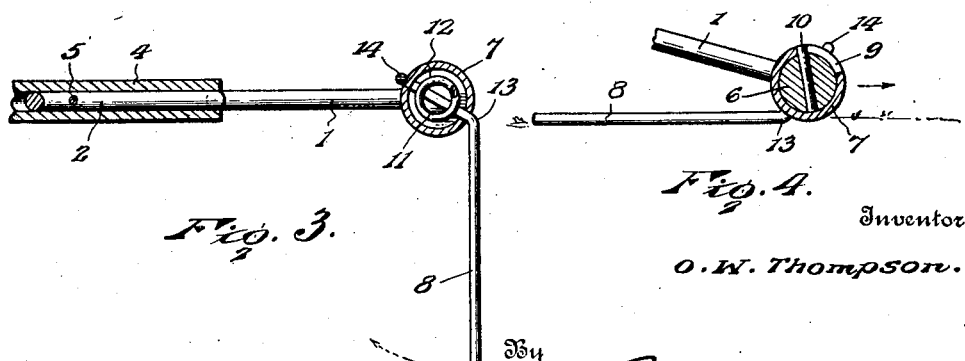
Inventor
O. W. Thompson.
By Lacey & Lacey, Attorneys Patented Dec. 13, 1927.

1,652,260

UNITED STATES PATENT OFFICE.

OTTO W. THOMPSON, OF CHICAGO, ILLINOIS.

LAWN RAKE.

Application filed March 4, 1926. Serial No. 92,293.

The invention relates to a hand rake, such as provided for use upon a lawn or in the garden, the main purpose in view being to supply a rake which may be readily cleaned of trash and other accumulation tending to cling to the teeth and impede the action of the implement.

The invention provides a rake embodying a head which is mounted to turn when the rake is pushed from the operator, thereby causing the teeth to lie flat upon the ground, so as to strip trash or other accumulation therefrom in a continued backward movement of the rake, the teeth automatically assuming upright position upon drawing the rake forward without any other manipulation or exertion upon the part of the operator.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a perspective view of a lawn rake, embodying the invention,

Figure 2 is an enlarged sectional view on the line 2—2 of Figure 1, looking in the direction of the arrows, Figure 3 is a detail sectional view on the line 3—3 of Figure 2, showing the tang and a portion of the bail in section, and Figure 4 is a detail sectional view showing the relation of the parts when the rake is pushed from the operator to clear the teeth of trash or other accumulation.

Corresponding and like parts are referred to in the following description and designated in the several views of the drawings by like reference characters.

The rake comprises a bail or U-shaped frame 1 having a centrally disposed tang 2 to which is fitted a handle 3 by means of a ferrule 4 which may be fast or otherwise fitted to the tang 2. A pin 5 or like fastening secures the parts 2, 3 and 4. The side members of the bail or frame 1 have journals 6 at their extremities to which the rake is pivoted so as to turn. The journals 6 may be cast or provided upon the ends of the frame or bail in any determinate way.

The rake comprises a head 7 and teeth 8. In the preferable construction the head 7 is hollow and consists of a length of pipe which is rotatably mounted upon the journals 6. Circumferential slots 9 are formed in opposite end portions of the head 7 and receive pins 10 which are let into the journals 6. The slots 9 are of a length to admit of the rake receiving approximately a one-quarter revolution and the slots are so positioned that in the normal use of the rake the teeth 8 stand upright and fold or lie flat on the ground, as indicated in Figure 4, when the rake is pushed from the operator.

The rake is held in a normal operative position by means of a spring 11 disposed within the head 7 and connected at one end to one of the journals 6 and at its opposite end to a block 12 arranged within the head and retained in place by suitable fastening means, such as one of the teeth 8, as indicated most clearly in Figure 2. The tension of the spring 11 may be adjusted by rotating the head 7 about the journals 6 preliminary to placing the pins 10 in position. When the pins 10 are removed, the rake may be detached from the frame or bail by springing the journals 6 outwardly, as will be readily understood.

The teeth 8 are preferably formed from stout wire, a length of which is doubled upon itself into the shape of a hair-pin and these teeth of hair-pin shape are fitted into openings formed in the head 7 at opposite points, the teeth being bent adjacent the head 7, as indicated most clearly in Figures 3 and 4 at 13, to prevent disengagement of the teeth from the head, the latter being confined between the closed ends 14 and the bends 13 of the teeth. The projecting ends of the pins 10 normally engage one end of the circumferential slots 9 and maintain the rake in normal working position, as indicated most clearly in Figure 1. When the rake is pushed from the operator, the points of the teeth 8 engage the ground and effect a turning of the rake about the journals 6, so that the teeth 8 assume a position flat upon the ground, as indicated most clearly in Figure 4, and a continued backward movement of the rake causes the teeth 8 to slide upon the ground and automatically clear themselves of trash or other accumulation. When the rake is again drawn forward the teeth assisted by the action of the spring 11 assume a normal or upright position, whereby to function properly in the accustomed manner of a rake.

Having thus described the invention, I claim:

1. A rake comprising a handle member having inwardly disposed spaced journals, a hollow head rotatably mounted upon said journals, stop means between the journals and head to limit the turning of the latter in each direction and prevent displacement of the parts, teeth carried by the head and normally held in operative position when the rake is drawn forwardly and adapted to turn with the head and lie flat upon the ground when the rake is pushed, a block secured within the head by one of the teeth, and a coil spring within the head connected at one end to the said block and at its opposite end to one of said journals.

2. A self-cleaning rake, comprising a U-shaped frame provided with a handle and having inwardly facing journals, a tubular head mounted upon said journals, and having circumferential slots in opposite ends, pins projecting from the journals and operating in the circumferential slots to limit the turning movement of the head, teeth fitted to the head, a block secured within the head by one of the teeth and a coil spring within the head and connected at its ends with the said block and one of the said journals.

In testimony whereof I affix my signature.

OTTO W. THOMPSON. [L. S.]